W. E. WERD & F. STEVENS.
FOOT POWER MOTOR.
APPLICATION FILED MAR. 5, 1910.
1,059,244.
Patented Apr. 15, 1913.
3 SHEETS—SHEET 1.
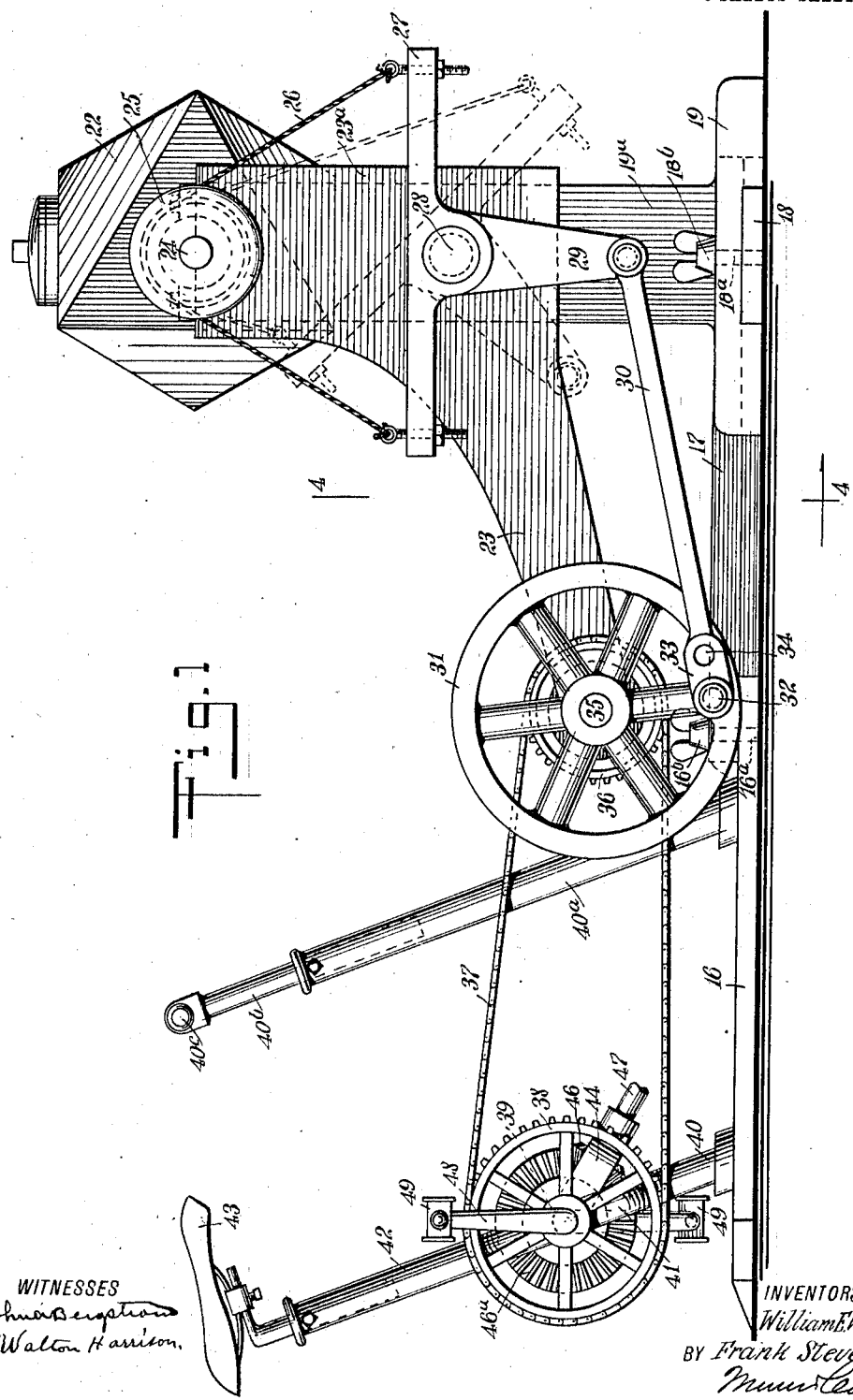
WITNESSES
INVENTORS
William E. Werd
Frank Stevens
BY
ATTORNEYS

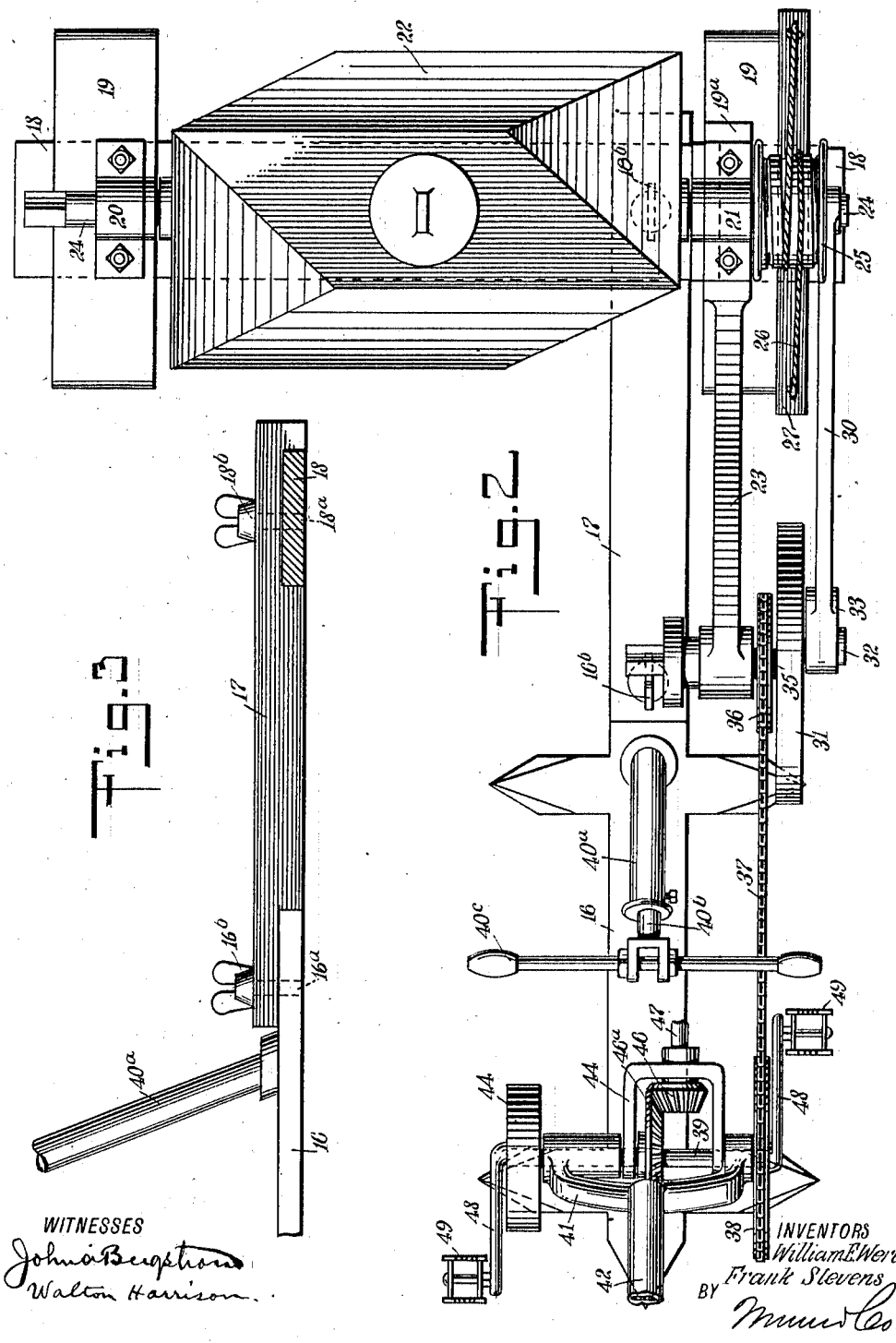

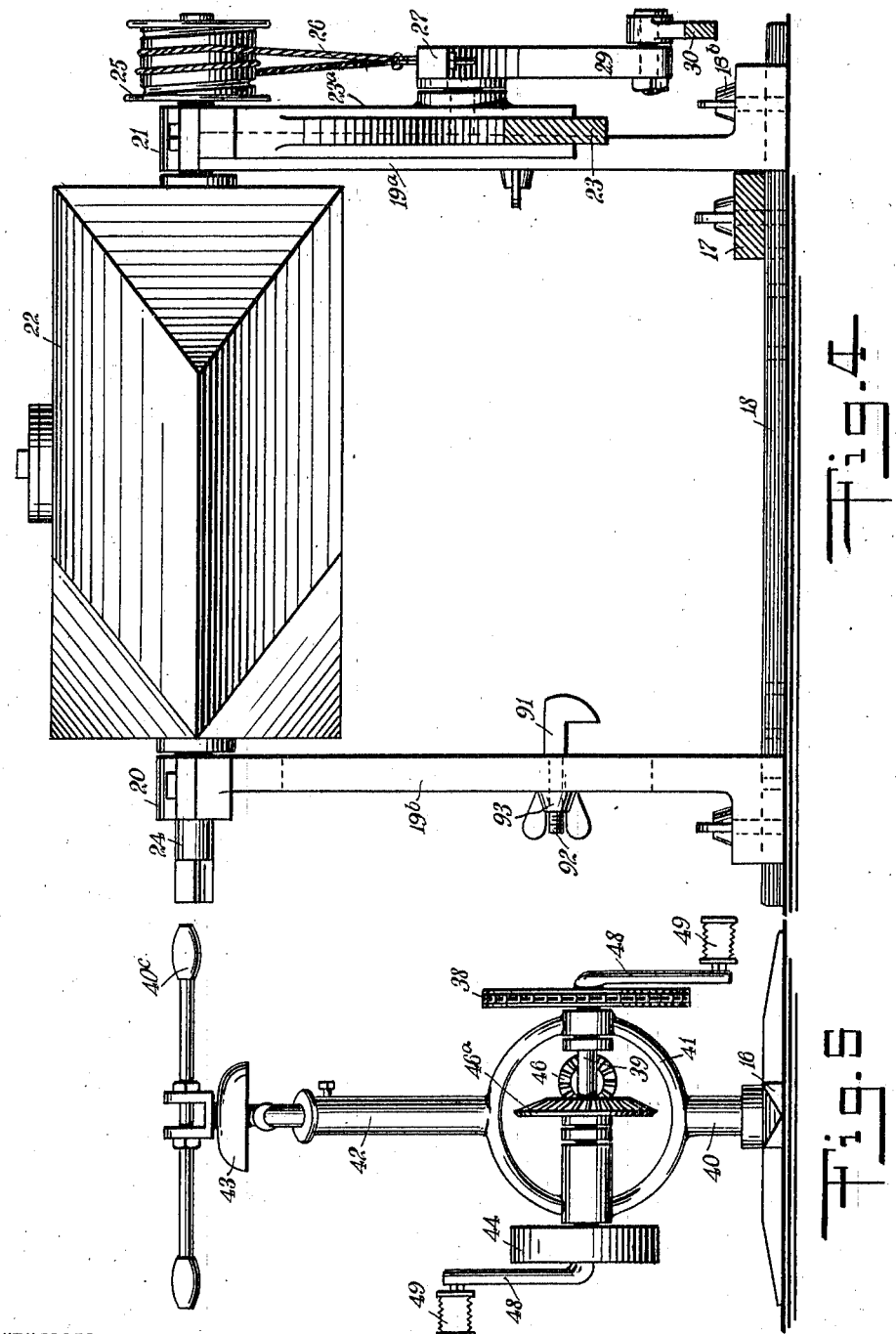

UNITED STATES PATENT OFFICE.

WILLIAM ELAIR WERD AND FRANK STEVENS, OF ROUNDUP, MONTANA, ASSIGNORS OF ONE-FOURTH TO ALFRED R. HAGAR, OF ROUNDUP, MONTANA.

FOOT-POWER MOTOR.

1,059,244.  Specification of Letters Patent.  Patented Apr. 15, 1913.

Application filed March 5, 1910. Serial No. 547,503.

*To all whom it may concern:*

Be it known that we, WILLIAM E. WERD and FRANK STEVENS, both citizens of the United States, and residents of Roundup, in the county of Fergus and State of Montana, have invented a new and Improved Foot-Power Motor, of which the following is a full, clear, and exact description.

Our invention relates to motors for general use, our more particular purpose being to provide a type of continuous drive motor operated by the feet somewhat after the manner of pedaling a bicycle, and adapted to drive various kinds of light mechanisms, such as churns, ice-cream freezers, washing machines, drills, pumps, punches, and the like.

Reference is to be had to the accompanying drawings forming a part of this specification, in which similar characters of reference indicate corresponding parts in all the figures.

Figure 1 is a side elevation showing our device as used for operating a churn; Fig. 2 is a plan view of the mechanism shown in Fig. 1; Fig. 3 is a detail showing a portion of the base of the framework; Fig. 4 is a section on the line 4—4 of Fig. 1, looking in the direction of the arrow; and Fig. 5 is a rear elevation showing a portion of the driving gear.

A base beam 16 is surmounted by another base beam 17 and connected therewith by aid of bolts 16$^a$ and thumb nuts 16$^b$. At 18 is a cross beam and adjustably connected with the latter by aid of the bolts 18$^a$ and thumb nuts 18$^b$ are two feet 19. Extending upwardly from the feet 19 and disposed upon opposite sides of the machine (see Fig. 4) are two standards 19$^a$, 19$^b$ upon the tops of which are bearings 20, 21. A churn 22 is mounted upon a rotating shaft 24, the latter being mounted in the bearings just mentioned. At 23 is an arm which is provided with a bracket portion 23$^a$ slidably fitted upon the standard 19$^a$. This bracket is used for supporting certain movable parts of the gearing, as hereinafter described.

A drum 25 is mounted rigidly upon the shaft 24. A cord 26 is wound partially around the drum and is connected with the ends of a rocking beam 27. This rocking beam is mounted upon a stub shaft 28 and is provided with an arm 29 extending downwardly, this arm being journaled to a pitman 30.

At 31 is a fly wheel which is provided with a crank pin 32, this crank pin extending through a cross head 33 of the pitman 30. This cross head is provided with an extra hole 34 for changing the position of the pin 32 if desired. The fly wheel 31 is mounted upon a stub shaft 35 which is journaled in the outer end of the arm 23.

Mounted rigidly upon the shaft 35 is a sprocket wheel 36 which is engaged by a sprocket chain 37. This sprocket chain also engages a sprocket wheel 38 which is mounted rigidly upon a shaft 39. A base 40, having generally a tubular form, is provided with a fork 41 above which is a tube 42, and supported by aid of the latter is a saddle 43. A fork 44 is journaled upon the shaft 39 and may be shifted into different positions at will. A shaft 47 is journaled in the fork 44, and mounted upon the shaft 47 is a bevel pinion 46. This pinion meshes with a bevel gear 46$^a$, the latter being rigid upon the shaft 39. The crank shaft 39 is provided with two cranks 48 integral with it, and mounted upon these cranks are pedals 49.

Mounted upon the base beam 16 is a tube 40$^a$ and inserted within the latter is a rod 40$^b$ which is adjustable relatively to the tube. The rod 40$^b$ supports a handle bar 40$^c$, the height of which is thus adjustable. An operator sitting upon the saddle 43 can grasp the handle bar 40$^c$.

The operation of the mechanism shown is as follows: The operator takes a seat upon the saddle 43 and places his feet upon the pedals 49. He then, by aid of the pedals, turns the cranks 48, so as to rotate the shaft 39. Power is thus transmitted through sprocket wheel 38, sprocket chain 37, sprocket wheel 36, shaft 35, fly wheel 31, pitman 30, rocking beam 27, cord 26, to the drum 25. The rotation of the fly wheel 31, in causing the rocking beam 27 to rock, gives the drum 25 an intermittent rotary motion. The result is that the churn 22 makes a few complete turns in one direction, and reversing makes an equal number of turns in the opposite direction, this process being kept up so long as power is applied to the pedals 49.

Our invention is shown in connection with a churn but it is understood that it is not limited in this application to churns but admits of a considerable variety of uses. The motor is adapted to drive various kinds of mechanism and is of special value in the household where some small driven member is to be actuated intermittently in opposite directions.

Having thus described our invention, we claim as new and desire to secure by Letters Patent:

1. In a foot power motor, the combination of a base, a supporting post mounted on said base, pedals, a crank shaft driven thereby, a second shaft, means for driving the second shaft from the crank shaft, a foot connected with the base, a standard extending upwardly from the foot, a bracket slidably fitted upon said standard and having an arm in which the said second shaft is journaled, a fly wheel on the said second shaft, a pitman connected with the fly wheel, and means operated from said pitman for actuating a driven member intermittently in opposite directions.

2. In a foot power motor, the combination with a base, and supporting standards connected with the base, of a bracket slidably fitted upon one of said standards, a stub shaft on said bracket, a rocking lever journaled on said stub shaft and having a depending arm, means operated from the rocking lever for actuating a driven member intermittently in opposite directions, an arm extending from the side of said bracket, a shaft journaled in the end of said arm, a pedal mechanism mounted on said base, and connected with the last mentioned shaft for driving the same, and means actuated from said shaft for rocking the said lever.

3. In a foot power motor, the combination with a base, of a supporting post mounted on said base, a crank shaft journaled on the supporting post, pedals for driving said crank shaft, a second shaft in front of the crank shaft, a foot on the base, a standard extending upwardly from said foot, a bracket slidably fitted upon said standard, an arm extending from said bracket and in the outer end of which the said second shaft is mounted, a fly wheel on said second shaft, means for driving the second shaft from the crank shaft, a stub shaft on said bracket, a rocking lever journaled on the said stub shaft and having a depending arm, and a pitman connecting said fly wheel with said arm of the rocking lever.

4. In a foot power motor, the combination with a supporting post, a pedal mechanism mounted on the supporting post and including a crank shaft, a shaft in front of the crank shaft and driven therefrom, a standard, a bracket slidably fitted upon said standard, an arm extending from the side of said bracket at the lower part thereof, a bearing at the free end of said arm in which the said shaft is journaled, a fly wheel on said shaft, a stub shaft on said bracket, a rocking lever journaled on said stub shaft and having a depending arm, and a pitman connecting said fly wheel with the arm of the rocking lever.

In testimony whereof we have signed our names to this specification in the presence of two subscribing witnesses.

WILLIAM ELAIR WERD.
FRANK STEVENS.

Witnesses:
FRED C. MARTIN,
T. H. LANIER.

---

Copies of this patent may be obtained for five cents each, by addressing the "Commissioner of Patents, Washington, D. C."